US012794112B2

(12) United States Patent
Wang et al.

(10) Patent No.: US 12,794,112 B2
(45) Date of Patent: Nov. 10, 2026

(54) ANTENNA SYSTEM AND TERMINAL DEVICE

(71) Applicant: Honor Device Co., Ltd., Shenzhen (CN)

(72) Inventors: Yi Wang, Shenzhen (CN); Xuan Zhai, Shenzhen (CN); Chao Guo, Shenzhen (CN); Ruoqing Zhu, Shenzhen (CN); Shaojie Chu, Shenzhen (CN); Kunpeng Wei, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 130 days.

(21) Appl. No.: 18/839,980

(22) PCT Filed: Apr. 14, 2023

(86) PCT No.: PCT/CN2023/088359

§ 371 (c)(1),
(2) Date: Aug. 20, 2024

(87) PCT Pub. No.: WO2024/032018

PCT Pub. Date: Feb. 15, 2024

(65) Prior Publication Data

US 2025/0183518 A1 Jun. 5, 2025

(30) Foreign Application Priority Data

Aug. 9, 2022 (CN) ......................... 202222089717.0

(51) Int. Cl.
*H01Q 1/24* (2006.01)
*H01Q 1/50* (2006.01)
(Continued)

(52) U.S. Cl.
CPC ............... *H01Q 1/243* (2013.01); *H01Q 1/50* (2013.01); *H01Q 1/521* (2013.01); *H01Q 5/35* (2015.01); *H01Q 5/371* (2015.01)

(58) Field of Classification Search
CPC .......... H01Q 1/243; H01Q 1/50; H01Q 1/521; H01Q 21/28; H01Q 5/328; H01Q 5/335;
(Continued)

(56) References Cited

U.S. PATENT DOCUMENTS 6,366,243 B1 * 4/2002 Isohatala ................ H01Q 5/364
343/702
9,509,040 B2 * 11/2016 Chen ...................... H01Q 5/371
(Continued)

FOREIGN PATENT DOCUMENTS

CN 110247160 A 9/2019
CN 110462930 A 11/2019
(Continued)

*Primary Examiner* — Thien M Le
(74) *Attorney, Agent, or Firm* — Slater Matsil, LLP

(57) ABSTRACT

This application provides an antenna system and a terminal device. A first feed point is disposed on the first radiation branch, and the first feed point is located at an end of the first radiation branch away from the second radiation branch; a second feed point is disposed on the second radiation branch, and the second feed point is located at an end of the second radiation branch away from the first radiation branch; the first ground return point is located at an electrical connection between the first radiation branch and the second radiation branch, and the first ground return point is located between the first feed point and the second feed point; and a second ground return point is disposed on the third radiation branch, and the second ground return point is located at an end of the third radiation branch away from the first gap.

20 Claims, 14 Drawing Sheets

(51) Int. Cl.

| | |
|---|---|
| ***H01Q 1/52*** | (2006.01) |
| ***H01Q 5/35*** | (2015.01) |
| ***H01Q 5/371*** | (2015.01) |

(58) Field of Classification Search
CPC .......... H01Q 5/35; H01Q 5/371; H01Q 5/378; H01Q 5/45; H01Q 9/42
See application file for complete search history.

(56) References Cited

U.S. PATENT DOCUMENTS

| | | | | |
|---|---|---|---|---|
| 11,316,255 | B2 | 4/2022 | Zhou et al. | |
| 11,532,871 | B2 | 12/2022 | Zhou et al. | |
| 12,046,812 | B2 | 7/2024 | Li et al. | |
| 2010/0090922 | A1* | 4/2010 | Jensen | H01Q 9/045 343/872 |
| 2021/0091824 | A1 | 3/2021 | Li | |
| 2021/0273340 | A1* | 9/2021 | Sun | H01Q 1/36 |
| 2022/0247078 | A1* | 8/2022 | Wang | H01Q 5/378 |
| 2024/0030607 | A1* | 1/2024 | Zhou | G06F 1/1698 |
| 2024/0250411 | A1* | 7/2024 | Li | H01Q 1/521 |
| 2024/0322439 | A1* | 9/2024 | Meng | H01Q 5/35 |
| 2024/0380095 | A1* | 11/2024 | Wang | H01Q 9/42 |
| 2025/0183518 | A1* | 6/2025 | Wang | H01Q 5/335 |

FOREIGN PATENT DOCUMENTS

| | | | |
|---|---|---|---|
| CN | 113013593 | A | 6/2021 |
| CN | 114221127 | A | 3/2022 |
| CN | 114552181 | A | 5/2022 |
| CN | 218415017 | U | 1/2023 |
| EP | 3190660 | A2 | 7/2017 |
| EP | 3823093 | A1 | 5/2021 |

* cited by examiner a b c a b

ANTENNA SYSTEM AND TERMINAL DEVICE

CROSS-REFERENCE TO RELATED APPLICATIONS

This application is a national stage of International Application No. PCT/CN2023/088359, filed on Apr. 14, 2023, which claims priority to Chinese Patent Application No. 202222089717.0, filed on Aug. 9, 2022. The disclosures of both of the aforementioned applications are hereby incorporated by reference in their entireties.

TECHNICAL FIELD

This application relates to the field of antenna technologies, and in particular, to an antenna system and a terminal device.

BACKGROUND

With rapid development of terminal devices and increasing use requirements of people, terminal devices are increasingly widely used in people's production and life, and communication quality requirements of users on terminal devices are also increasingly high.

The communication quality of the terminal device depends heavily on performance of a terminal antenna disposed on the terminal device. With popularization of the fifth generation mobile communication technology (5th-Generation, 5G), use demand of a multiple-input multiple-output (multi-input multi-output, MIMO) antenna technology on a terminal device becomes increasingly high. A current terminal device has gradually developed from an antenna system of 2*2 to an antenna system of 4*4. Except for an antenna for wireless fidelity (wireless fidelity, WIFI) and a global positioning system (global positioning system, GPS) at the beginning, 8 to 15 antennas with different functions are usually accommodated on the terminal device.

In some terminal devices, a full-screen structure solution with an ultra-narrow frame is used, which requires high structure compactness of the terminal device. After the terminal device satisfies the MIMO communication specification, more antennas need to be added, and space of the antenna is further compressed. In the terminal device with a highly-compressed space, a MIMO antenna usually needs to use different antennas to transmit and receive signals of a same frequency band, and consequently, when the signals in the same frequency band are transmitted and received by the different antennas, isolation between the antennas is reduced, and performance of an antenna system is reduced.

SUMMARY

This application provides an antenna system and a terminal device, to improve isolation between antennas, to improve performance of an antenna system and improve communication quality.

According to a first aspect, an antenna system is provided. The antenna system includes: a first radiation branch, a second radiation branch and a third radiation branch, where the first radiation branch and the second radiation branch are electrically connected, and a first gap is provided between the second radiation branch and the third radiation branch; a first feed point is disposed on the first radiation branch, and the first feed point is located at an end of the first radiation branch away from the second radiation branch; a second feed point is disposed on the second radiation branch, and the second feed point is located at an end of the second radiation branch away from the first radiation branch; the antenna system further includes: a first ground return point, where the first ground return point is located at an electrical connection between the first radiation branch and the second radiation branch, and the first ground return point is located between the first feed point and the second feed point; and a second ground return point is disposed on the third radiation branch, and the second ground return point is located at an end of the third radiation branch away from the first gap.

In the antenna system, on the basis of the first radiation branch and the second radiation branch, the third radiation branch that can be decoupled is added, and no feed point is provided on the third radiation branch, but the ground return point is arranged, so that the third radiation branch is used as a suspended parasitic radiation branch to influence an excitation mode of the whole antenna system. The third radiation branch is added, so that differential-mode currents are formed on the first radiation branch and the second radiation branch when a feed source 1 and a feed source 2 feed signals of a same frequency. In this way, some currents on the two radiation branches cancel each other, so that a signal flowing from the feed source 2 to the first radiation branch is reduced, a signal flowing from the feed source 1 to the second radiation branch is also reduced, mutual coupling between the two radiation branches is reduced, isolation between the two radiation branches is improved, and decoupling is implemented, to improve performance of the whole antenna system.

In some possible implementations, the first feed point is configured to feed a high-frequency signal, and the second feed point is configured to feed a high-frequency signal and/or a medium-frequency signal.

In a MIMO scenario, when the feed source 2 and the feed source 1 feed high-frequency signals through the second feed point and the first feed point respectively, the third radiation branch is added, so that differential-mode currents can be formed on the first radiation branch and the second radiation branch, some currents on the two radiation branches cancel each other, so that a signal flowing from the feed source 2 to the first radiation branch is reduced, a signal flowing from the feed source 1 to the second radiation branch is also reduced, mutual coupling between the two radiation branches in the MIMO scenario is reduced, isolation between the two radiation branches in the MIMO scenario at a high frequency is improved, antenna performance of the whole antenna system in a high-frequency band in the MIMO scenario is improved, and communication quality of the high-frequency band in the MIMO scenario is improved. The second feed point may alternatively feed a medium-frequency signal, so that the second radiation branch may be compatible with a medium-frequency band, and the antenna system supports the high-frequency band while also being compatible with the medium-frequency band, to expand a bandwidth of the antenna system.

In some possible implementations, when the first feed point and the second feed point feed the high-frequency signal, a current mode in the antenna system is a differential mode.

According to the current mode in the differential mode, some currents on the two radiation branches are canceled, the signal flowing from the feed source 2 to the first radiation branch is reduced, the signal flowing from the feed source 1 to the second radiation branch is reduced, mutual coupling between the two radiation branches is reduced, the isolation between the two radiation branches at the high frequency is improved, and the antenna performance of the whole antenna system in the high-frequency band is improved.

In some possible implementations, the high-frequency signal is a signal in an N41 frequency band.

In the MIMO scenario at the N41 frequency band, the signal flowing from the feed source 2 to the first radiation branch is reduced, the signal flowing from the feed source 1 to the second radiation branch is also reduced, mutual coupling between the two radiation branches in the MIMO scenario is reduced, the isolation between the two radiation branches in the MIMO scenario at the N41 frequency band is improved, the antenna performance of the whole antenna system at the N41 frequency band in the MIMO scenario is improved, and communication quality at the N41 frequency band in the MIMO scenario is improved.

In a possible implementation, a length difference between a length of the third radiation branch and a quarter wavelength of the signal in the N41 frequency band is less than a length error threshold.

The length of the third radiation branch may be a length of a quarter wavelength of a signal fed by the feed source 2, for example, may be a length equal to the quarter wavelength, or may be a length close to the quarter wavelength, a difference between the length of the third radiation branch and the quarter wavelength is less than a preset length error threshold, and the length error threshold may be 0.5 mm, 1 mm, or the like, to ensure that a resonance state is achieved when the signal is fed, and maintain antenna performance. For example, when the feed source 1 and the feed source 2 feed a signal in the N41 frequency band, the length of the third radiation branch may be a length of a quarter of a wavelength corresponding to a center frequency of the N41 frequency band or a length close to the quarter wavelength, to ensure a resonance state.

In a possible implementation, a distance between the first ground return point and the second feed point is greater than a distance between the first feed point and the first ground return point.

A length that is of the second radiation branch and that is provided when the second radiation branch is used as a main radiation branch when the feed source 2 feeds a signal is greater than a length that is of the first radiation branch and that is provided when the first radiation branch is used as a main radiation branch when the feed source 1 feeds a signal. Therefore, in a resonant mode, a frequency band that matches the second radiation branch between the first ground return point and the second feed point is lower than a frequency band that matches the first radiation branch between the first feed point and the first ground return point, and the second radiation branch can be compatible with the medium-frequency band, so that the antenna system is compatible with the medium-frequency band while supporting the high-frequency band, to expand the bandwidth of the antenna system.

In a possible implementation, the second ground return point is located at an end of the third radiation branch away from the first gap, and a length of the third radiation branch is greater than a distance between an end of the second radiation branch close to the first gap to the second feed point.

When the second ground return point is located at the end of the third radiation branch away from the first gap, if the length of the third radiation branch is too short, a resonant frequency corresponding to a case in which a current mode excited by the antenna system is the differential mode is too high. In this case, if the length of the third radiation branch is greater than the distance between the end of the second radiation branch close to the first gap to the second feed point, that a resonance frequency of the third radiation branch and a frequency band at which decoupling is required can be matched can be ensured, to ensure decoupling effect.

In a possible implementation, a first tuning circuit is further disposed on the third radiation branch, and an end of the third radiation branch close to the first gap is grounded through the first tuning circuit.

The first tuning circuit is disposed, so that a ground return tuning point can be added on the third radiation branch, so that a tuning capability of the antenna system is improved, and therefore the performance of the antenna system can be further improved.

In a possible implementation, a second tuning circuit is further disposed on the second radiation branch, the second tuning circuit is located between the second feed point and the first ground return point, and the second radiation branch is grounded through the second tuning circuit.

The second tuning circuit is disposed, so that a tuning point can be added on the second radiation branch, the tuning capability of the antenna system is improved, and therefore the performance of the antenna system can be further improved.

In some possible implementations, the antenna system further includes a third tuning circuit, and the first feed point is grounded through the third tuning circuit.

In some possible implementations, the antenna system further includes a fourth tuning circuit, and the second feed point is grounded through the fourth tuning circuit.

The third tuning circuit and/or the fourth tuning circuit are/is disposed, so that the tuning capability of the antenna system is improved, and therefore the performance of the antenna system can be further improved.

In some possible implementations, a shape of the first radiation branch is L-shaped.

The first radiation branch of the L-shaped structure is used, so that an antenna size can be reduced and an antenna layout is facilitated while the antenna size is maintained.

According to a second aspect, a terminal device is provided. The terminal device includes the antenna systems according to any one of the technical solutions of the first aspect.

DETAILED DESCRIPTION OF ILLUSTRATIVE EMBODIMENTS

Technical solutions in embodiments of this application are described below with reference to the accompanying drawings of the following embodiments of this application. In descriptions of embodiments of this application, "/" indicates "or", unless otherwise specified. For example, A/B may indicate A or B; and the term "and/or" in this specification describes only an association relationship between associated objects and indicates that three relationships may exist. For example, A and/or B may represent the following three cases: Only A exists, both A and B exist, and only B exists. In addition, in the description of embodiments of this application, "a plurality of" means "two or more".

The following terms "first", "second", and "third" are merely intended for a purpose of description, and shall not be understood as an indication or implication of relative importance or implicit indication of the number of indicated technical features. Therefore, a feature limited by "first", "second", and "third" may explicitly or implicitly include one or more features.

An antenna system in embodiments of this application may be applied to a terminal device, for example, a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the terminal device is not limited in embodiments of this application.

Figure 1:
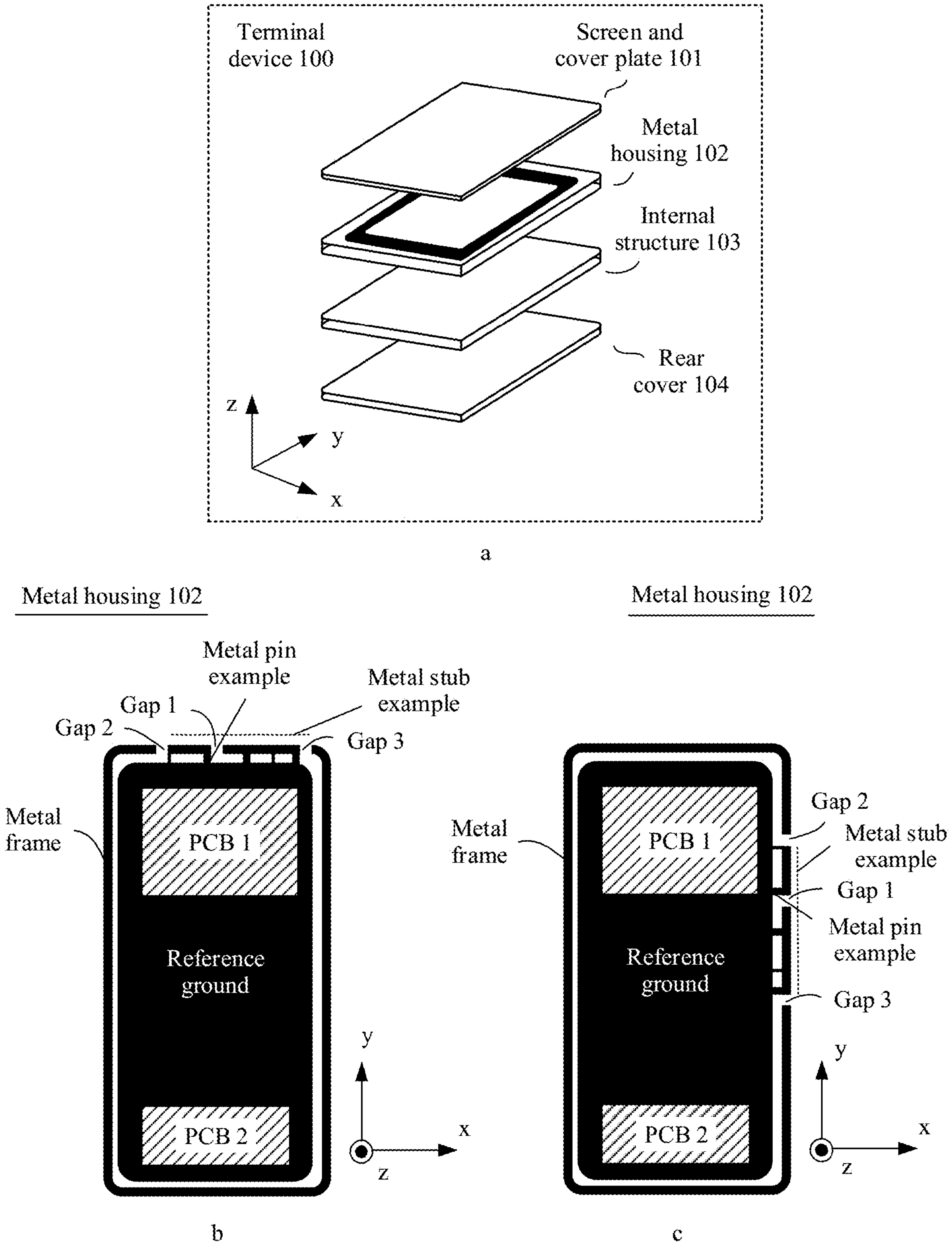
FIG. 1 is a schematic diagram of a structure of a terminal device according to an embodiment of this application.

FIG. 1 is a schematic structural diagram of a terminal device 100 according to an embodiment of this application. As shown in figure a in FIG. 1, the terminal device 100 provided in this embodiment of this application may be provided with a screen and cover plate 101, a metal housing 102, an internal structure 103, and a rear cover 104 in sequence along a z-axis from top to bottom.

The screen and cover plate 101 may be configured to implement a display function of the terminal device 100. The metal housing 102 may be used as a main framework of the terminal device 100 to provide rigid support for the terminal device 100. The internal structure 103 may include a collection of electronic components and mechanical components that implement various functions of the terminal device 100. For example, the internal structure 103 may include a shielding cover, screws, strengthening ribs, and the like. The rear cover 104 may be an exterior surface of the back of the terminal device 100. The rear cover 104 may be made of a glass material, a ceramic material, plastic, and the like in different implementations.

An antenna system provided in an embodiment of this application can be applied in the terminal device 100 shown in figure a in FIG. 1 to support wireless communication function of the terminal device 100. In some embodiments, the antenna system may be arranged on the metal housing 102 of the terminal device 100. In some other embodiments, the antenna system involved in the antenna solution may be arranged on the rear cover 104 of the terminal device 100, or the like.

As an example, taking the metal housing 102 having a metal frame structure as an example, b and c in FIG. 1 show a schematic composition of the metal housing 102. A figure b in FIG. 1 shows an example in which the antenna system is arranged on a short side of the terminal device, and a figure c in FIG. 1 shows an example in which the antenna system is arranged on a long side of the terminal device. Certainly, the antenna system may alternatively be disposed on a short side of the terminal device and a long side adjacent to the short side. The figure b in FIG. 1 is used as an example for description, and the metal housing 102 may be made of a metal material such as aluminum alloy. As shown in figure b in FIG. 1, a reference ground may be arranged on the metal housing 102. The reference ground may be a metal material with a large area, which is used to provide most of the rigid support, while providing a zero potential reference for various electronic components. In the example shown in figure b in FIG. 1, a metal frame may further be arranged on a periphery of the reference ground. The metal frame may be a complete and closed metal frame, and the metal frame may include a partially or completely suspended metal strip. In some other implementations, the metal frame may alternatively be a metal frame interrupted by one or more gaps as shown in figure b in FIG. 1. For example, in the example of figure b in FIG. 1, a gap 1, a gap 2, and a gap 3 may be provided at different positions of the metal frame. These gaps can break the metal frame to obtain individual metal branches. In some embodiments, some or all of these metal branches can be used as antenna radiation branches, to implement structural reuse during antenna disposing and reduce difficulty of antenna disposing. When the metal branch is used as an antenna radiation branch, a position of a gap corresponding to one end of the metal branch or positions of gaps corresponding to two ends of the metal branch can be flexibly selected based on antenna disposing.

In the example shown in figure b in FIG. 1, one or more metal pins may further be arranged on the metal frame. In some examples, the metal pins may be provided with screw holes for securing other structural parts by screws. In other examples, the metal pin may be coupled to a feed point to feed an antenna through the metal pin when the metal branch connected to the metal pin is used as a radiation branch of the antenna. In some other examples, the metal pins may alternatively be connected to other electronic components through coupling to achieve corresponding electrical connection functions. In this embodiment of this application, in figure b and figure c in FIG. 1, the metal pin may be coupled to the feed point or may be grounded.

In this example, configuration of a printed circuit board (printed circuit board, PCB) on the metal housing is also shown. A main board (main board) and a sub board (sub board) of a board split design are taken as an example. In other examples, the main board and the sub board may alternatively be connected of, for example, an L-PCB design. In some embodiments of this application, the main board (for example, a PCB 1) may be configured to carry electronic components that implement various functions of the terminal device 100, such as a processor, a memory, a radio frequency module. The sub board (such as a PCB 2) may alternatively be used to carry electronic components, such as a universal serial bus (universal serial bus, USB) interface and a related circuit, and a speak box (speak box). For another example, the sub board may further be configured to carry a radio frequency circuit or the like corresponding to an antenna arranged at the bottom (that is, a part in a negative direction of a y-axis of the terminal device).

It should be noted that the various radiation branches mentioned below (a first radiation branch, a second radiation branch, a third radiation branch, a radiation branch 1, a radiation branch 2 and a radiation branch 3, and the like) and various radiation bodies are the metal radiation branches mentioned above.

With rapid development of terminal devices and increasing use requirements of people, terminal devices are increasingly widely used in people's production and life, and communication quality requirements of users on terminal devices are also increasingly high.

The communication quality of the terminal device depends heavily on performance of a terminal antenna disposed on the terminal device. With popularization of 5G, use demand of a MIMO antenna technology on a terminal device becomes increasingly high. Currently, an antenna system of 2*2 to an antenna system of 4*4 have been gradually developed. Except for an antenna for WIFI and a GPS at the beginning, 8 to 15 antennas with different functions are usually accommodated on the terminal device.

In some terminal devices, a full-screen structure solution with an ultra-narrow frame is used, which requires high structure compactness of the terminal device. After the terminal device satisfies the MIMO communication specification, more antennas need to be added, and space of the antenna is further compressed. In the terminal device with a highly-compressed space, a MIMO antenna usually needs to use different antennas to transmit and receive signals of a same frequency band, and consequently, when the signals in the same frequency band are transmitted and received by the different antennas, isolation between the antennas is reduced, and performance of an antenna system is reduced.

Figure 2:
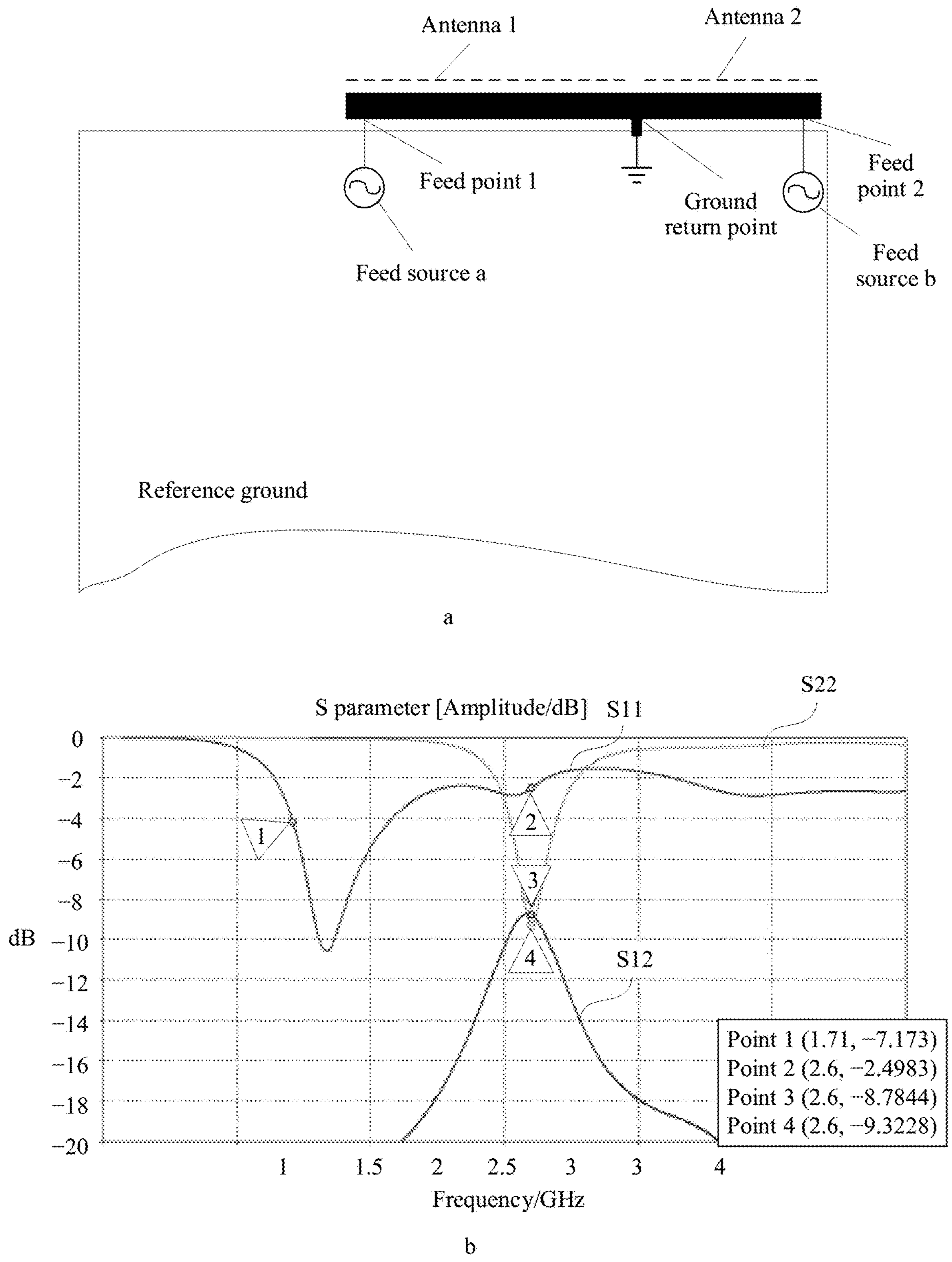
FIG. 2 is a schematic diagram of a common antenna system and a corresponding S parameter graph.

Refer to a structure shown in a in FIG. 2. A common MIMO antenna includes an antenna 1 and an antenna 2. A feed point 1 is disposed on the antenna 1, and the feed point 1 may be connected to a feed source a; a feed point 2 is disposed on the antenna 2, and the feed point 2 may be connected to a feed source b; and the antenna 1 and the antenna 2 are grounded through a same ground return point. For example, a signal in an N41 frequency band is radiated. When the two feed points respectively feed signals in the N41 frequency band (2.6 GHz), a curve (S12) of isolation between the two antennas can be seen in figure b in FIG. 2, which is only −8 decibels (dB). This cannot meet requirement of antenna performance.

In the technical solution of this application, an excitation mode is changed by adding a parasitic branch used for decoupling in an original antenna system and disposing a gap between the original antennas. When the antenna is in an excited state, due to the added parasitic radiation branch, differential mode currents can be generated on the original two antennas, so that some currents distributed on the original two antennas are canceled, so that a signal flowing from the feed source a to the antenna 2 is reduced, a signal flowing from the feed source b to the antenna 1 is also reduced, mutual coupling between the two antennas is reduced, and the isolation between the two antennas is improved.

Figure 3:
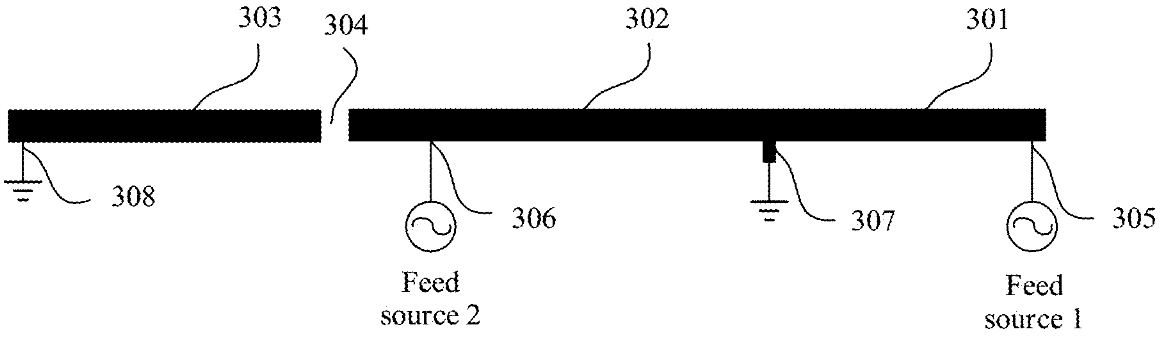
FIG. 3 is a schematic diagram of a structure of an antenna system according to an embodiment of this application.

FIG. 3 is a schematic diagram of a structure of an antenna system according to an embodiment of this application. According to the above antenna solution, a third radiation branch 303 for decoupling is added in the antenna system, and the added third radiation branch 303 can change a current mode in the antenna system and improve isolation between different antennas. As shown in FIG. 3, the antenna system includes a first radiation branch 301, a second radiation branch 302, and a third radiation branch 303. The first radiation branch 301 and the second radiation branch 302 are electrically connected, and the first radiation branch 301 and the second radiation branch 302 are of an integral structure connected together structurally with different functions and effects as two radiators. The third radiation branch 303 and the second radiation branch 302 are sequentially arranged along a length direction, and a first gap 304 is provided between the second radiation branch 302 and the third radiation branch 303.

A first feed point 305 is disposed on the first radiation branch 301, and the first feed point 305 is located at an end of the first radiation branch 301 away from the second radiation branch 302. A second feed point 306 is disposed on the second radiation branch 302, and the second feed point 306 is located at an end of the second radiation branch 302 away from the first radiation branch 301. The antenna system further includes: a first ground return point 307, the first ground return point 307 is located at an electrical connection between the first radiation branch 301 and the second radiation branch 302, and the first ground return point 307 is located between the first feed point 305 and the second feed point 306. The first radiation branch 301 and the second radiation branch 302 share the first ground return point 307. A second ground return point 308 is disposed on the third radiation branch 303, and the second ground return point 308 is located at an end of the third radiation branch 303 away from the first gap 304.

In the antenna system shown in FIG. 3, the first feed point 305 may be connected to the feed source 1, and the second feed point 306 may be connected to the feed source 2. Optionally, the feed point and the feed source may be directly connected, or may be connected through a series capacitor, or may be connected through a matching circuit in another matching form, which is not limited in this embodiment of this application.

In the antenna system shown in FIG. 3, on the basis of the first radiation branch 301 and the second radiation branch 302, the third radiation branch 303 that can be decoupled is added, and no feed point is provided on the third radiation branch 303, but the ground return point is arranged, so that the third radiation branch 303 is used as a suspended parasitic radiation branch to influence an excitation mode of the whole antenna system. The third radiation branch 303 is added, so that differential-mode currents are formed on the first radiation branch 301 and the second radiation branch 302 when a feed source 1 and a feed source 2 feed signals of a same frequency. In this way, some currents on the two radiation branches cancel each other, so that a signal flowing from the feed source 2 to the first radiation branch 301 is reduced, a signal flowing from the feed source 1 to the second radiation branch 302 is also reduced, mutual coupling between the two radiation branches is reduced, isolation between the two radiation branches is improved, and decoupling is implemented, to improve performance of the whole antenna system.

Optionally, the feed source 2 may feed low-frequency signals through the second feed point 306, such as low-frequency signals in bands such as B5 and B8; or may feed medium-frequency signals, such as medium-frequency signals in frequency bands such as B1, B2, and B3, or may feed high-frequency signals in frequency bands such as B7 and B41. The feed source 1 may feed low-frequency signals through the first feed point 305, such as low-frequency signals in bands such as B5 and B8; or may feed medium-frequency signals, such as medium-frequency signals in frequency bands such as B1, B2, and B3, or may feed high-frequency signals in frequency bands such as B7 and B41. A frequency band of a fed signal is not limited in this embodiment of this application.

In some embodiments, the feed source 2 may feed high-frequency signals through the second feed point 306, such as signals in bands such as B7 and N41; or may feed medium-frequency signals, such as signals in frequency bands such as B1, B2, and B3. The feed source 1 may feed a high-frequency signal through the first feed point 305. In a MIMO scenario, when the feed source 2 and the feed source 1 feed high-frequency signals respectively, the third radiation branch 303 is added, so that differential-mode currents can be formed on the first radiation branch 301 and the second radiation branch 302, some currents on the two radiation branches cancel each other, so that a signal flowing from the feed source 2 to the first radiation branch 301 is reduced, a signal flowing from the feed source 1 to the second radiation branch 302 is also reduced, mutual coupling between the two radiation branches in the MIMO scenario is reduced, isolation between the two radiation branches in the MIMO scenario at a high frequency is improved, antenna performance of the whole antenna system in a high-frequency band in the MIMO scenario is improved, and communication quality of the high-frequency band in the MIMO scenario is improved.

The technical effects of embodiments of this application are described below with reference to antenna parameters of a specific embodiment. For example, in an embodiment of this application, a port of the antenna system connected to the feed source 2 is a 1 port, and a port of the antenna system connected to the feed source 1 is a 2 port. It should be noted that S12 and S21 are forward transmission coefficients. S21 is used as an example, S21 represents a magnitude of energy transmitted from the 2 port to the 1 port. When S21 is used to indicate isolation, a smaller value indicates larger isolation. S11 and S22 are the reflection systems of the 1 port and the 2 port respectively, and larger S11 and S22 indicate larger energy reflected by the corresponding ports. Larger energy reflected by the port indicates larger energy loss and a lower matching degree; and conversely, smaller S11 and S22 indicate less energy reflected by the corresponding ports, smaller energy loss, and a higher matching degree.

Figure 4:
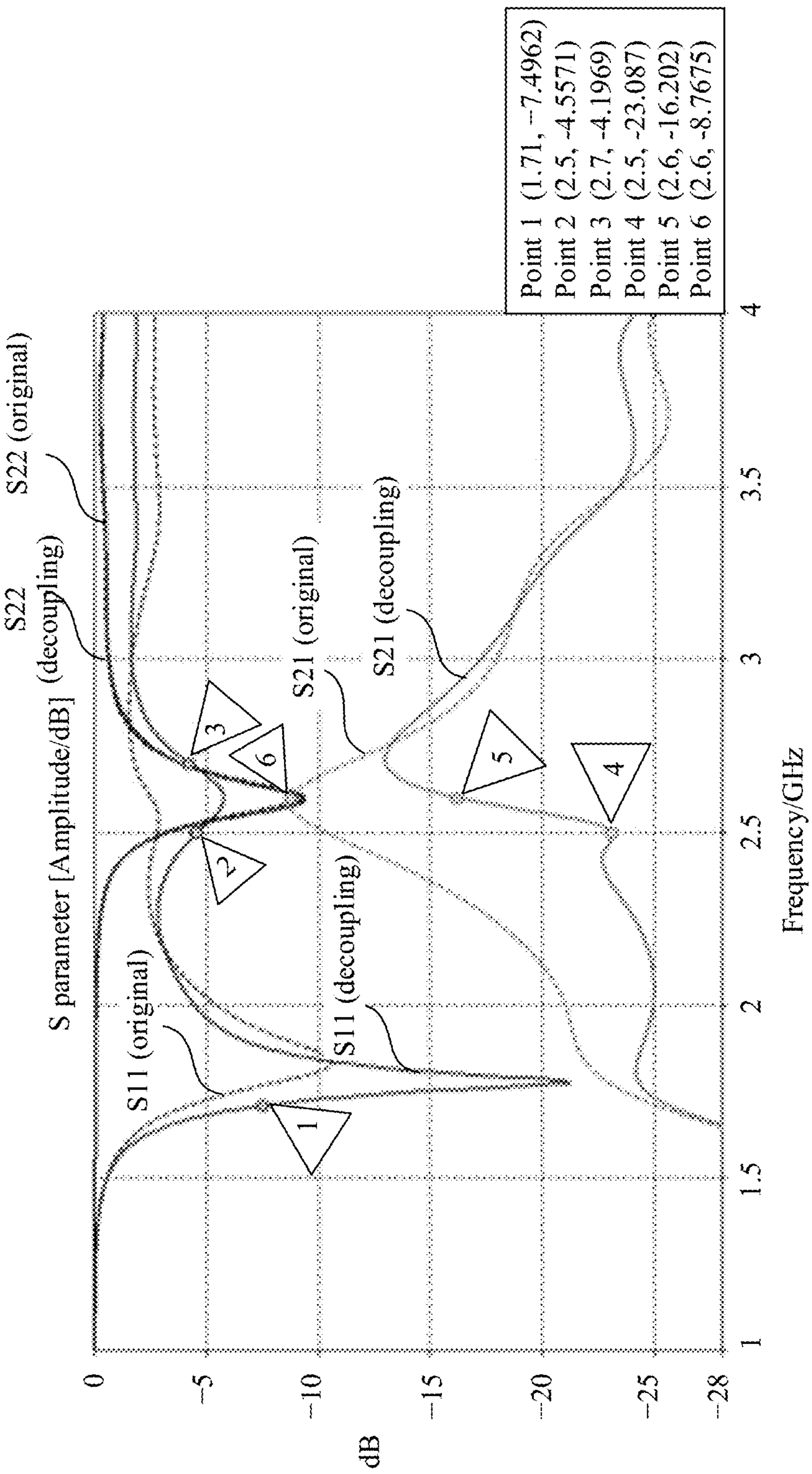
FIG. 4 is a schematic diagram in which an S parameter graph of an antenna system according to an embodiment of this application is compared with an S parameter graph of a conventional antenna system.

FIG. 4 is a comparison diagram of S parameter curves obtained before and after the third radiation branch 303 for decoupling is added in the antenna system. For ease of marking, the S parameter curve obtained after adding the third radiation branch is marked as: decoupling, and the S parameter curve obtained before adding the third radiation branch is marked as: original. It can be seen from FIG. 4 that, after the third radiation branch 303 is added in the antenna system, the value of the isolation (S21) is reduced by a large amplitude, original −8.7675 dB (a marked point 6) is reduced to −16.202 dB (a marked point 5) at 2.6 GHZ, and the isolation is reduced by more than 7 dB. It can be further seen from FIG. 4 that after the third radiation branch 303 is added, a large pit in a medium-frequency band appears in the S11 curve, indicating that energy loss of the medium-frequency band is reduced. S11 is lowered in a frequency band range of 2.5 GHz to 2.7 GHZ (specifically, between a mark point 2 and a mark point 3), indicating that energy loss of a high-frequency band is also reduced. A mark point 1 is a 1.71 GHz frequency that has a reflection coefficient of −7.4962 dB, and an S11 at this frequency is reduced. As shown in FIG. 4, S22 does not change sharply and does not deteriorate.

Optionally, on the basis of the foregoing embodiments, a distance between the first ground return point 307 and the second feed point 306 is greater than a distance between the first feed point 305 and the first ground return point 307. Still refer to FIG. 3. A length that is of the second radiation branch 302 and that is provided when the second radiation branch 302 is used as a main radiation branch when the feed source 2 feeds a signal is greater than a length that is of the first radiation branch 301 and that is provided when the first radiation branch 301 is used as a main radiation branch when the feed source 1 feeds a signal. Therefore, in a resonant mode that matches a quarter wavelength, a frequency band that matches the second radiation branch 302 between the first ground return point 307 and the second feed point 306 is lower than a frequency band that matches the first radiation branch 301 between the first feed point 305 and the first ground return point 307, and the second radiation branch 302 can be compatible with the medium-frequency band, so that the antenna system is compatible with the medium-frequency band while supporting the high-frequency band, to expand the bandwidth of the antenna system.

Figure 5:
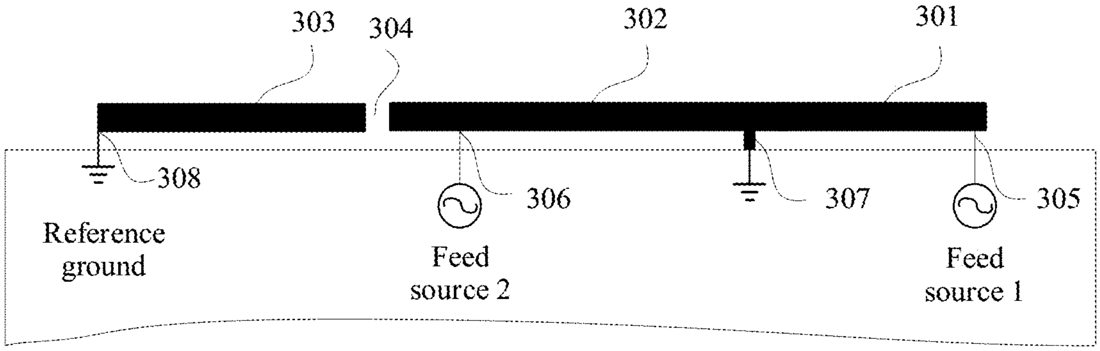
FIG. 5 is a schematic diagram of structures of antenna systems in different structures according to an embodiment of this application.
Figure 5:
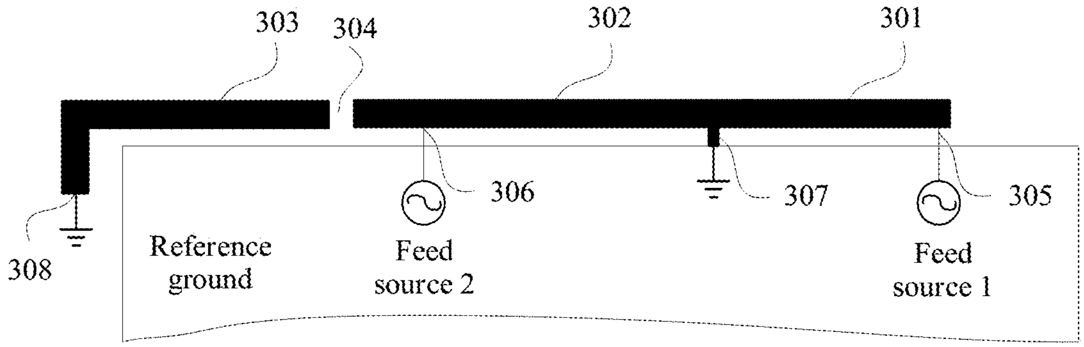
Figure 5:
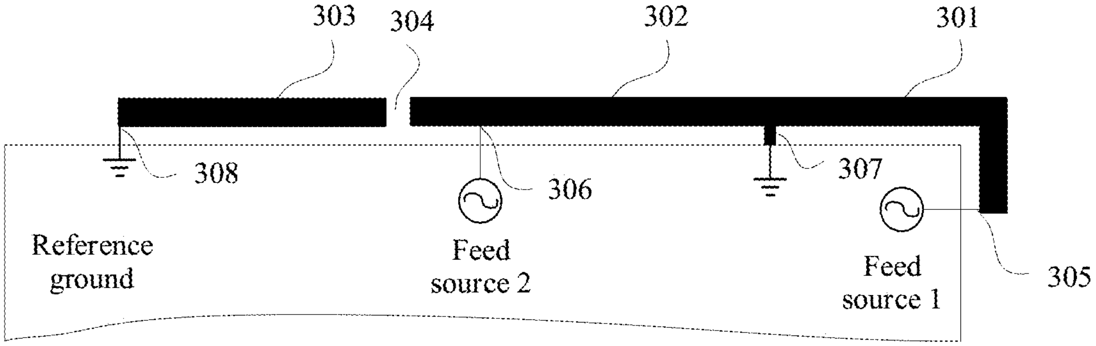

Optionally, the second ground return point 308 may be located at an end of the third radiation branch 303 away from the first gap 304, for example, may be at a specific distance from the end of the third radiation branch 303 away from the first gap 304, for example, of a smaller size, such as 1 mm and 0.5 mm away from the end of the third radiation branch 303 away from the first gap. The second ground return point 308 may alternatively be located at an end of the third radiation branch 303 away from the first gap 304, for example, as shown in FIG. 5. Figure a in FIG. 5 shows a structure in which the second ground return point 308 is located at the end away from the first gap 304 when the third radiation branch 303 is an I-shaped structure. In addition, when the second ground return point 308 is located at the end of the third radiation branch 303 away from the first gap, if the length of the third radiation branch 303 is too short, a resonant frequency corresponding to a case in which a current mode excited by the antenna system is a differential mode is too high. In this case, if the length of the third radiation branch 303 is greater than a distance between an end of the second radiation branch 302 close to the first gap 304 to the second feed point 306, that a resonance frequency of the third radiation branch 303 and a frequency band at which decoupling is required can be matched can be ensured, to ensure decoupling effect.

In some embodiments, the third radiation branch 303 may also be an "L"-shaped structure as shown in b in FIG. 5, such radiation branch of the L-shaped structure is used, so that an antenna size can be reduced and facilitate an antenna layout while the antenna size is maintained. Optionally, the first radiation branch 301 may also be an "L"-shaped structure. For example, as shown in figure c in FIG. 5, due to such a structure, an antenna size can be reduced and an antenna layout is facilitated while the antenna size is maintained. In the antenna system, whether to set the first radiation branch 301 to the "L"-shaped structure or the third radiation branch 303 to the "L"-shaped structure is determined based on a specific location in the terminal device, for example, a location close to a left side or close to a right side.

Optionally, on the basis of the foregoing embodiment, the length of the third radiation branch 303 may be a length of a quarter wavelength of a signal fed by the feed source 2, for example, may be a length equal to the quarter wavelength, or may be a length close to the quarter wavelength, a difference between the length of the third radiation branch 303 and the quarter wavelength is less than a preset length error threshold, and the length error threshold may be 0.5 mm, 1 mm, or the like, to ensure that a resonance state is achieved when the signal is fed, and maintain antenna performance. For example, when the feed source 1 and the feed source 2 feed a signal in the N41 frequency band, the length of the third radiation branch 303 may be a length of a quarter of a wavelength corresponding to a center frequency of the N41 frequency band. Usually, the length of the third radiation branch 303 is adjusted to match different frequencies. For example, the length of the third radiation branch 303 may be reduced to adapt to a signal with a high frequency. When a signal with a low frequency needs to be adapted, the length of the third radiation branch 303 may be increased, so that the length of the third radiation branch 303 remains near a quarter wavelength of an excitation signal to ensure a resonance state.

Figure 6:
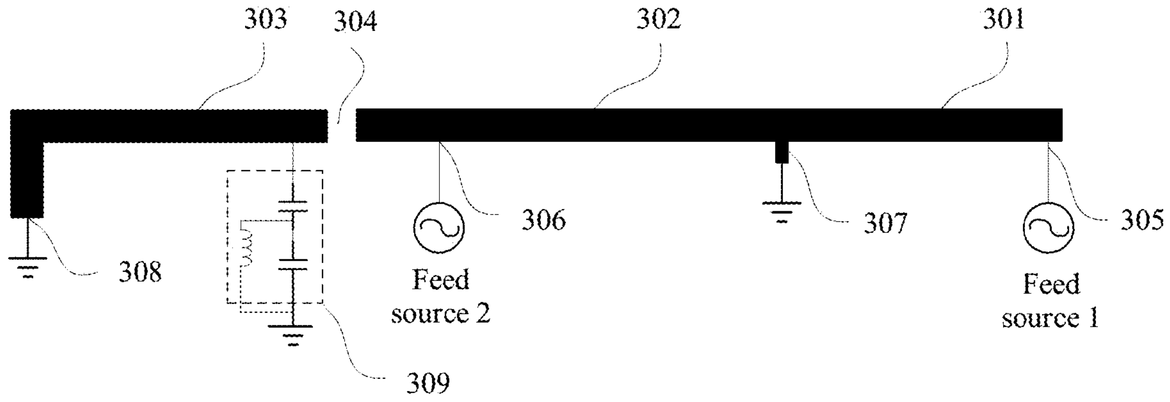
FIG. 6 is a schematic diagram of a structure of an antenna system in a different tuning form according to an embodiment of this application.

Optionally, based on the foregoing embodiments, refer to the antenna system in FIG. 6. A first tuning circuit 309 may be disposed on the third radiation branch 303, and an end of the third radiation branch 303 close to the first gap 304 is grounded through the first tuning circuit 309. The first tuning circuit 309 may be a microstrip line with a fixed width and length, or may be a microstrip line with a changed width and length, or may be a form of an LC filter circuit, for example, may include any one or a combination of a series capacitor, a parallel capacitor, a series inductor, a parallel inductor, and the like. A specific form of the first tuning circuit 309 is not limited in this embodiment of this application. Optionally, the first tuning circuit 309 may alternatively be a structure in which a plurality of switches are connected to different matching forms, and the first tuning circuit 309 may alternatively be an electronic tuner (Tuner). In FIG. 6, the first tuning circuit 309 with a T-shaped structure tuning circuit as an example is illustrated, and in fact, the tuning circuit can be adjusted based on an actual situation, and a capacitance value and an inductance value in the tuning circuit are not limited. The first tuning circuit 309 is disposed, so that a ground return tuning point can be added on the third radiation branch 303, so that a tuning capability of the antenna system is improved, and therefore the performance of the antenna system can be further improved.

Figure 7:
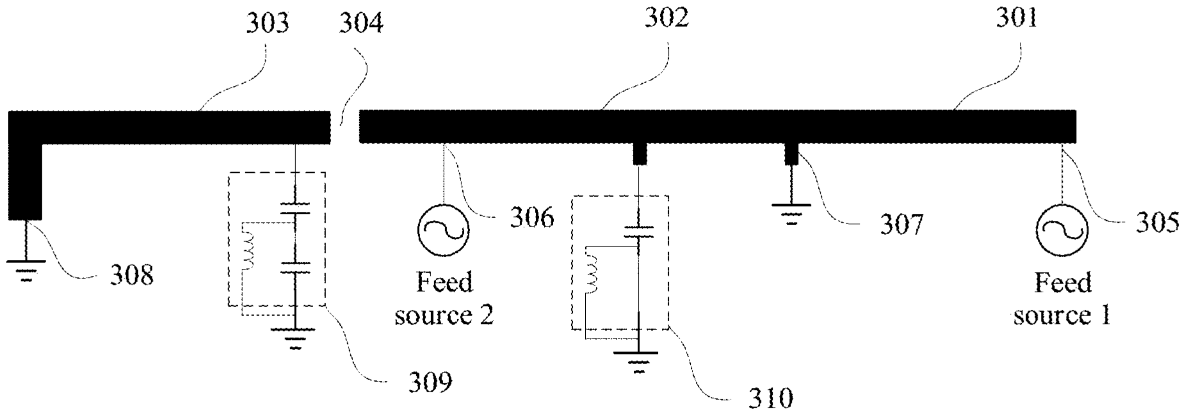
FIG. 7 is a schematic diagram of a structure of an antenna system in a different tuning form according to an embodiment of this application.

Based on the foregoing embodiments, a second tuning circuit 310 is further disposed on the second radiation branch 302. Refer to a structure of the antenna system shown in FIG. 7, the second tuning circuit 310 is located between the second feed point 306 and the first ground return point 307, and the second radiation branch 306 is grounded through the second tuning circuit 310. The implementation of the second tuning circuit 310 may be a microstrip line with a fixed width and length, or may be a microstrip line with a changed width and length, or may be a form of an LC filter circuit, for example, may include any one or a combination of a series capacitor, a parallel capacitor, a series inductor, a parallel inductor, and the like. Optionally, the second tuning circuit 310 may alternatively be a structure in which a plurality of switches are connected to different matching forms, and the second tuning circuit 310 may alternatively be an electronic tuner (Tuner). A specific form of the second tuning circuit 310 is not limited in this embodiment of this application. In FIG. 7, the tuning circuit with the first tuning circuit 310 as an L-shaped structure is illustrated, and in fact, the tuning circuit can be debugged according to an actual situation, and the capacitance value and the inductance value in the tuning circuit are not limited. The second tuning circuit 310 is disposed, so that a tuning point can be added on the second radiation branch 302, the tuning capability of the antenna system is improved, and therefore the performance of the antenna system can be further improved.

Figure 8:
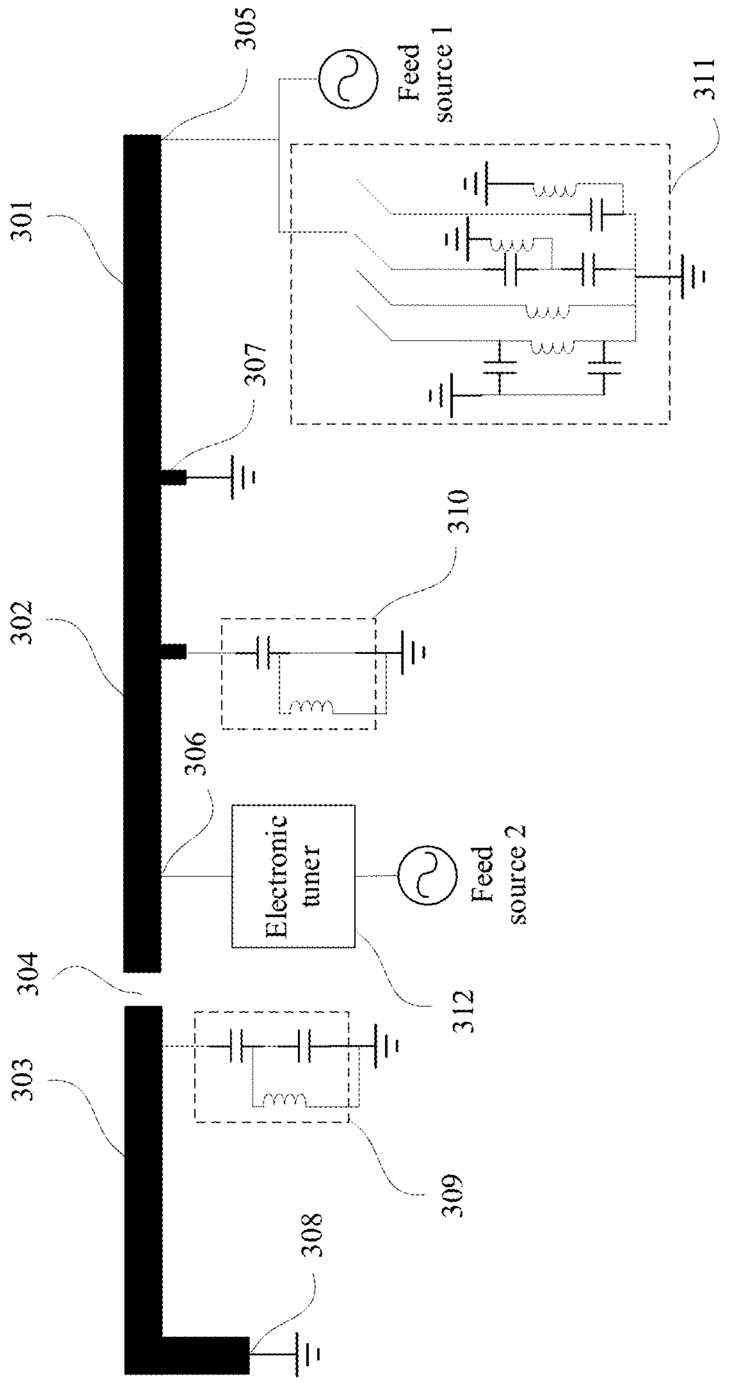
FIG. 8 is a schematic diagram of a structure of an antenna system in a different tuning form according to an embodiment of this application.

Refer to FIG. 8. Optionally, based on the foregoing embodiments, the structure of the antenna system may further include the third tuning circuit 311, and the first feed point 305 is grounded through the third tuning circuit 311. Optionally, refer to FIG. 8. The antenna system further includes a fourth tuning circuit 312, and the second feed point 306 is grounded through the fourth tuning circuit 312. For implementations of the third tuning circuit 311 and the fourth tuning circuit 312, refer to descriptions of the first tuning circuit 309 and the second tuning circuit 310. In FIG. 8, the third tuning circuit 311 is a structure in which different matching forms are connected, and the fourth tuning circuit is a connecting electronic tuner as an example. The third tuning circuit 311 and/or the fourth tuning circuit 312 are/is disposed, so that the tuning capability of the antenna system is improved, and therefore the performance of the antenna system can be further improved.

To describe an implementation principle of the technical solutions of this application more clearly, how to solve the technical problems according to embodiments of this application is described in detail with reference to a change of current distribution in a specific embodiment.

Figure 9:
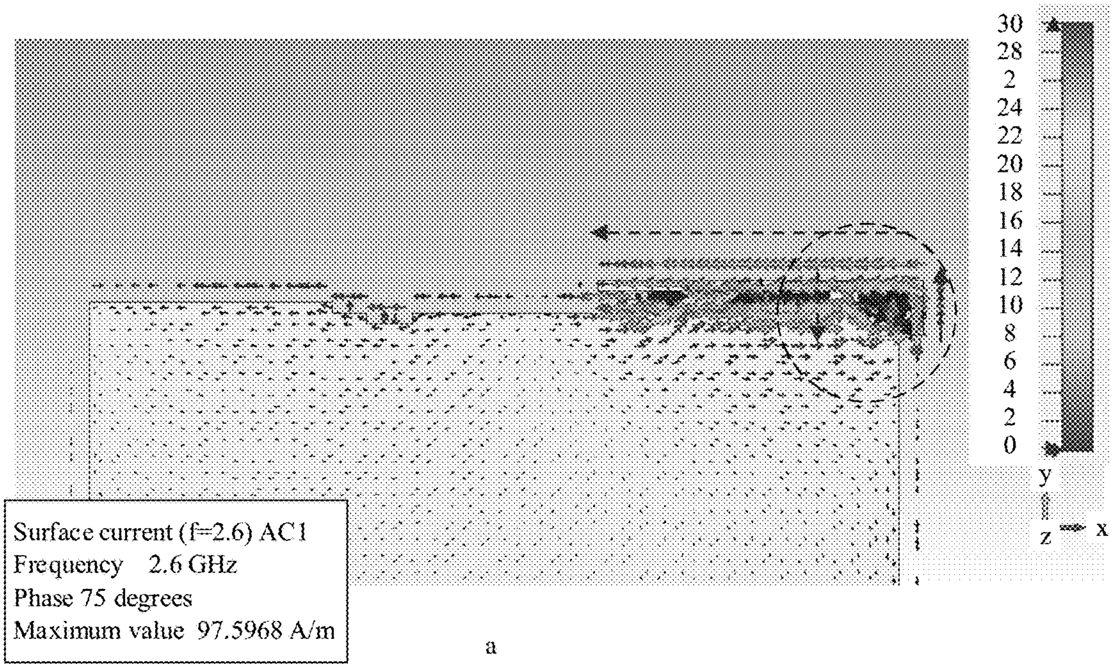
FIG. 9 is a diagram of current distribution of a common antenna system during feeding.
Figure 9:
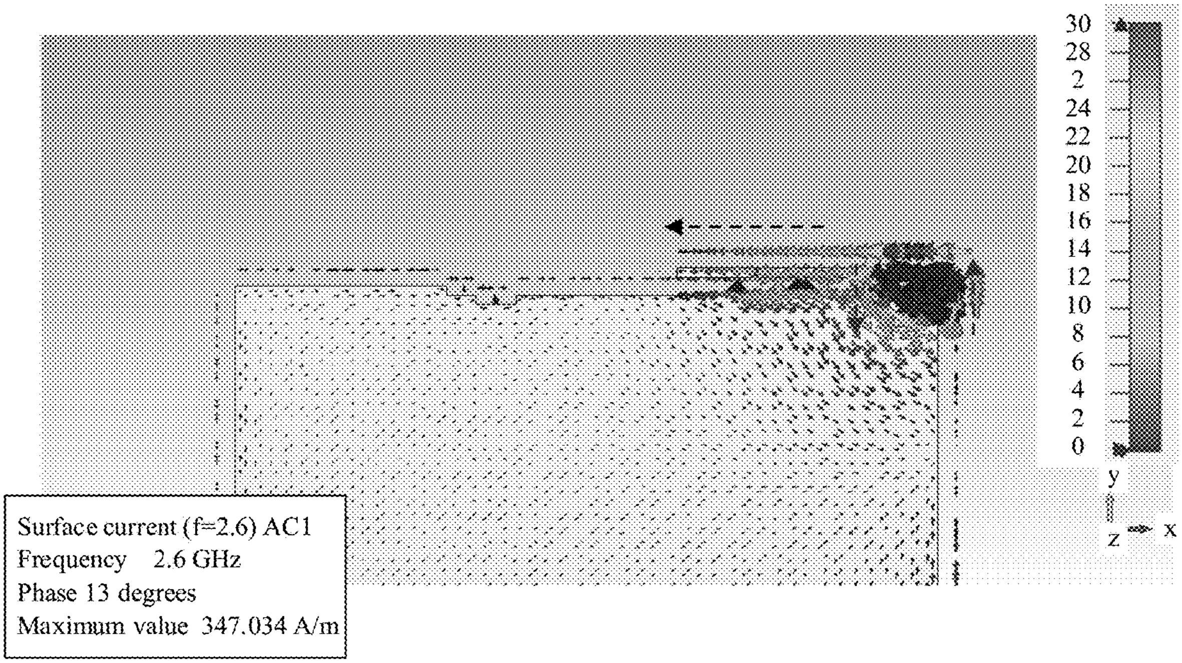
Figure 10:
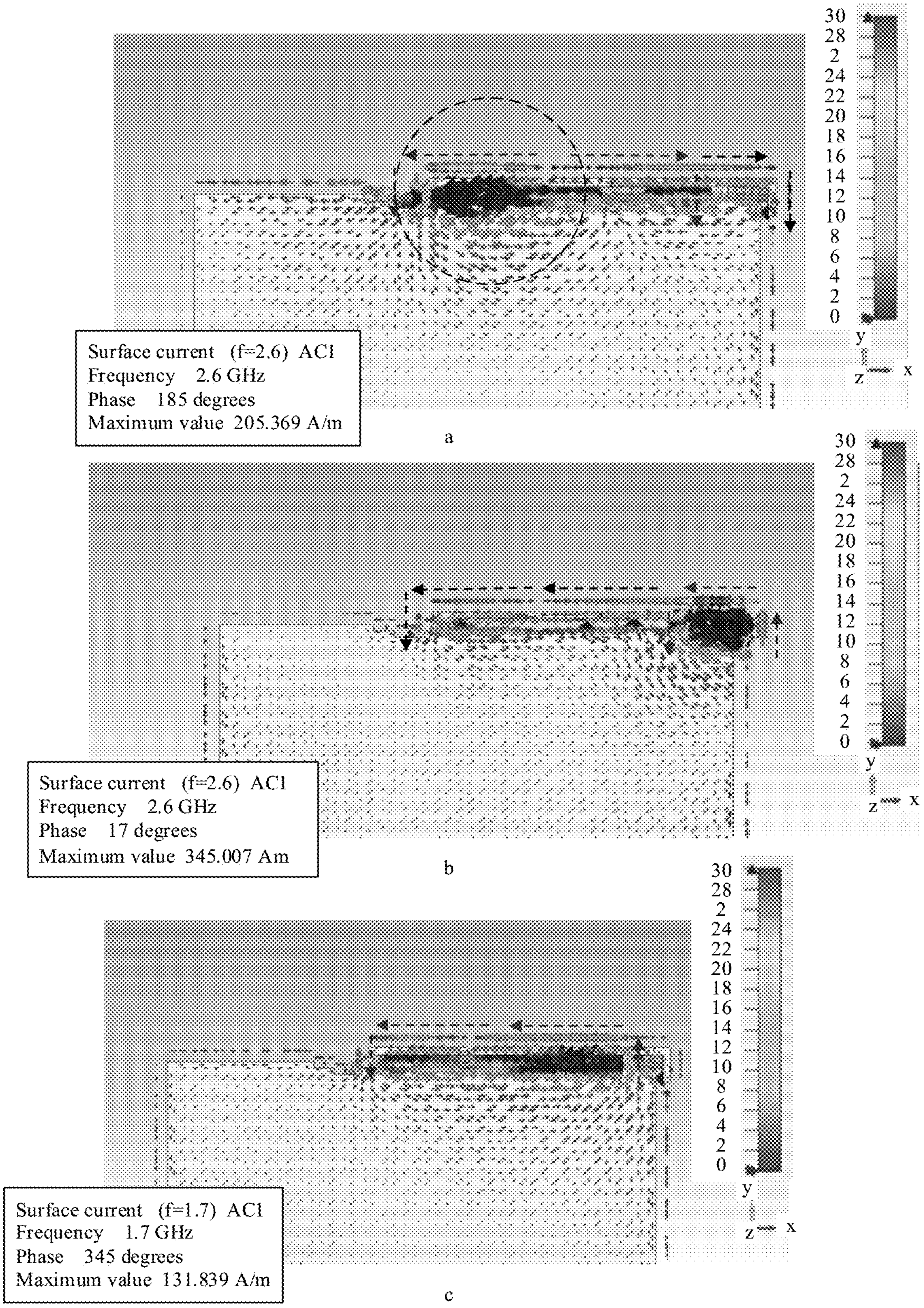
FIG. 10 is a diagram of current distribution of an antenna system during feeding according to an embodiment of this application.

As shown in FIG. 9, FIG. 9 is a diagram of current distribution before and after the third radiation branch 303 is added in the antenna system. Figure a in FIG. 9 is a diagram of current distribution before the third radiation branch 303 is added when the feed source 2 feeds an N41 frequency band signal through the second feed point 306. Figure b in FIG. 9 is a diagram of current distribution before the third radiation branch 303 is added when the feed source 1 feeds an N41 frequency band signal through the first feed point 305. It can be seen from the comparison that, before the third radiation branch 303 is added, current directions of the two feed points when feeding signals are the same, and a common mode (Common mode, C mode) is presented. Still refer to a diagram of current distribution after the third radiation branch 303 is added shown in FIG. 10. Figure a in FIG. 10 is a diagram of current distribution after the third radiation branch 303 is added when the feed source 2 feeds an N41 frequency band signal through the second feed point 306. Figure b in FIG. 10 is a diagram of current distribution after the third radiation branch 303 is added when the feed source 1 feeds an N41 frequency band signal through the first feed point 305. It can be seen from the comparison that, after the third radiation branch 303 is added, directions of currents fed by the two feed points are opposite, and a form of a differential mode (differential mode, D mode) is presented. After the third radiation branch 303 is added and a signal of a medium-frequency band is fed from the second feed point 306, a diagram of current distribution may be shown in figure c in FIG. 10. The current distribution is uniform, and an effective radiator size is large, which can ensure antenna performance of the antenna system in the medium-frequency band.

Figure 11:
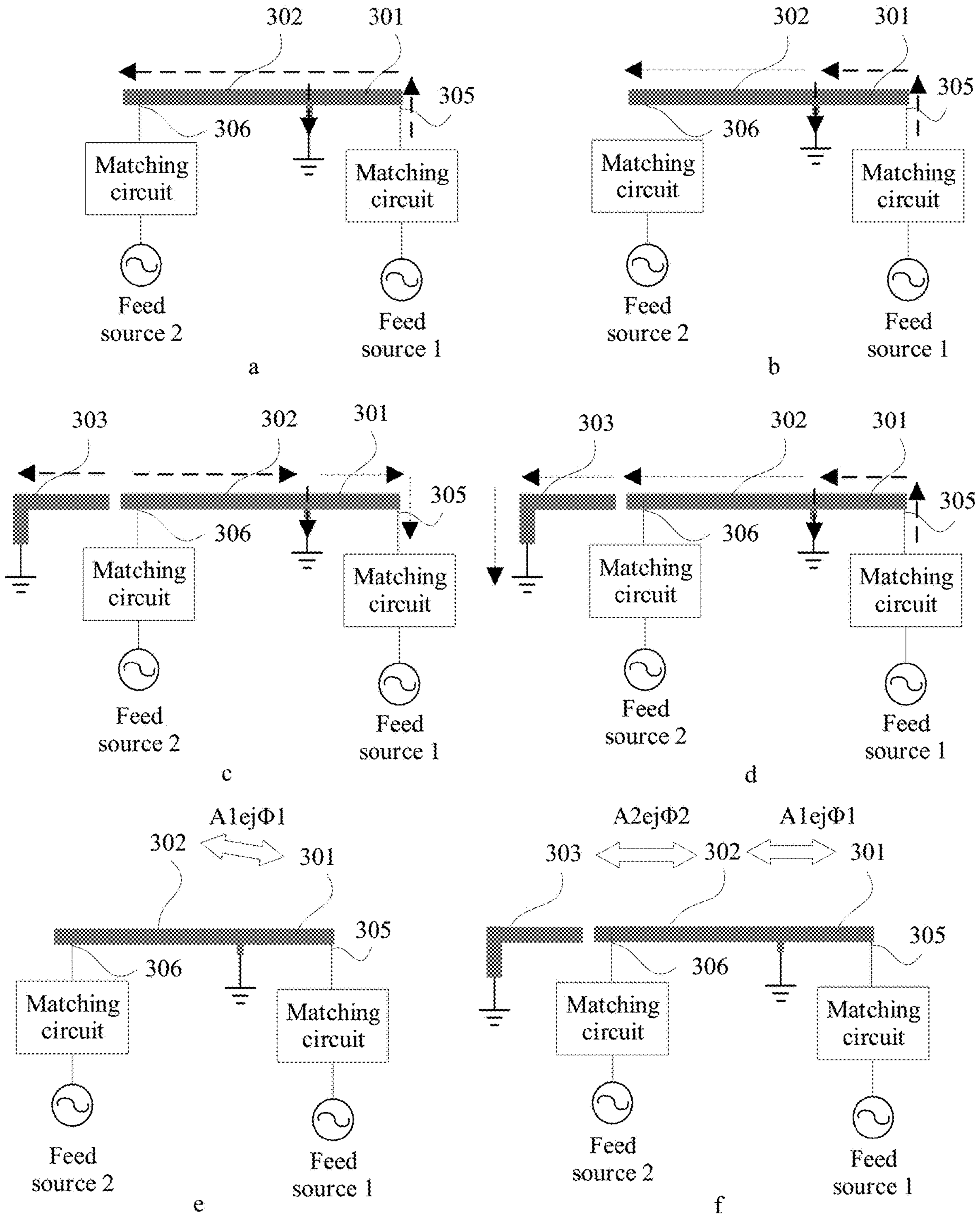
FIG. 11 is a schematic diagram of current distribution of an antenna system before and after a third radiation branch is added according to an embodiment of this application.

In order to clearly describe a current flow direction, the diagrams of current distribution shown in FIG. 9 and FIG. 10 are abstracted into a current distribution schematic diagram, as shown in FIG. 11. A dotted arrow in FIG. 11 represents a flow direction of a current in a corresponding state, a thick dotted line represents a larger current, and a thin dotted line represents a smaller current. Figure a in FIG. 11 is a schematic diagram of a current flowing direction in a C-mode form before the third radiation branch 303 is added when the feed source 2 feeds an N41 frequency band signal through the second feed point 306. Figure b in FIG. 11 is a schematic diagram of a current flowing direction in a C-mode form before the third radiation branch 303 is added when the feed source 1 feeds an N41 frequency band signal through the first feed point 305. It can be learned that, before the third radiation branch 303 is added, the current directions of the two feed points feeding signals are the same, and the common mode is presented. Figure c in FIG. 11 is a schematic diagram of a current flowing direction in a D-mode form after the third radiation branch 303 is added when the feed source 2 feeds an N41 frequency band signal through the second feed point 306. Figure d in FIG. 11 is a schematic diagram of a current flowing direction in a C-mode form after the third radiation branch 303 is added when the feed source 1 feeds an N41 frequency band signal through the first feed point 305. It can be seen from the comparison that, after the third radiation branch 303 is added, directions of currents fed by the two feed points are opposite, and a form of a differential mode is presented. A principle of decoupling is described in figures e and fin FIG. 11 from the perspective of currents. A1 and A2 are current amplitudes of the 1 port and the 2 port, respectively, Φ1 and Φ2 are phases of the 1 port and the 2 port, where a current multiplied by a phase is a magnitude of a coupled current. When $A1e^{j\Phi1}=A2e^{j\Phi2}$, a current coupled from the 1 port to the 2 port is the same as a current coupled from the 2 port to the 1 port. At this time, the currents are equal in magnitudes and opposite in directions, and can cancel each other and realize decoupling.

The technical effects of embodiments of this application may alternatively be described by using other parameters.

Figure 12:
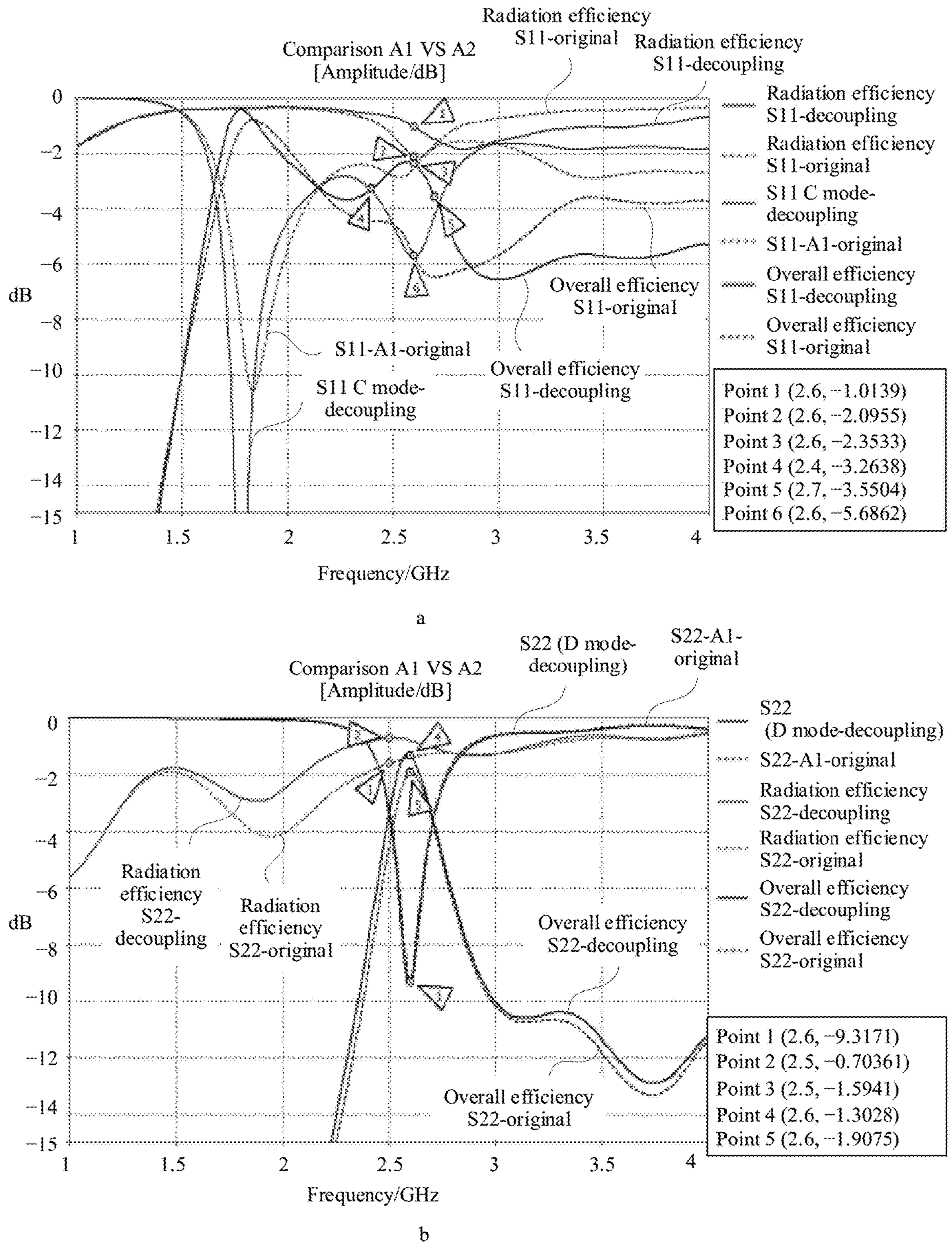
FIG. 12 is a parameter curve comparison diagram of an antenna system before and after a third radiation branch is added according to an embodiment of this application.

Figure a in FIG. 12 is a curve comparison diagram of efficiency of a 1-port antenna in an original state and a decoupling state. As shown in figure a in FIG. 12, at 2.6 GHz, radiation efficiency in a decoupling state is increased by approximately 1 dB when being compared to radiation efficiency in an original state (a point 1 to a point 2). In figure a in FIG. 12, S11 is reduced significantly from the original state to the decoupling state by approximately more than 3 dB at 2.6 GHZ, and a total efficiency is increased by approximately 2 dB (a point 6 to a point 5). Figure b in FIG. 12 is a curve comparison diagram of efficiency of a 2-port antenna in an original state and a decoupling state. As shown in figure b in FIG. 12, S22 is not changed significantly from the original state to the decoupling state at 2.6 GHz. As shown in figure b in FIG. 12, radiation efficiency in a decoupling state is increased by approximately 0.9 dB when being compared to radiation efficiency in an original state (a point 2 to a point 3). A total efficiency is increased from −1.9 to −1.3, and a total efficiency is increased by approximately 0.6 dB (a point 4 to a point 5).

Figure 13:
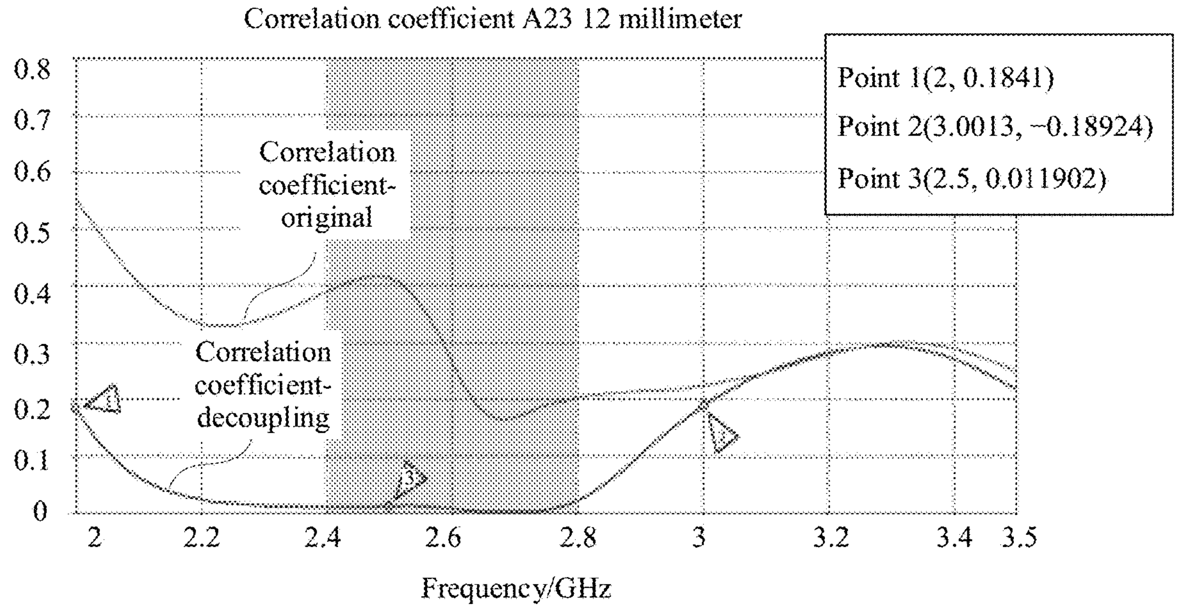
FIG. 13 is a correlation coefficient curve comparison diagram of a first radiation branch and a second radiation branch before and after a third radiation branch is added according to an embodiment of this application.

From the perspective of correlation, FIG. 13 is a graph of the envelope correlation coefficients (ECC) of the first radiation branch and the second radiation branch in the original state and the decoupling state, which is described by using the third radiation branch of 12 mm as an example. As shown in FIG. 13, the correlation coefficient in the decoupling state is reduced in the broadband range as a whole. Particularly, at 0.3 and 0.4 of the original state between 2.4 GHz-2.6 GHz, the correlation coefficient is reduced to less than 0.05, which indicates that correlation between the first radiation branch and the second radiation branch after decoupling is low, that is, the isolation between the first radiation branch and the second radiation branch is high.

Figure 14:
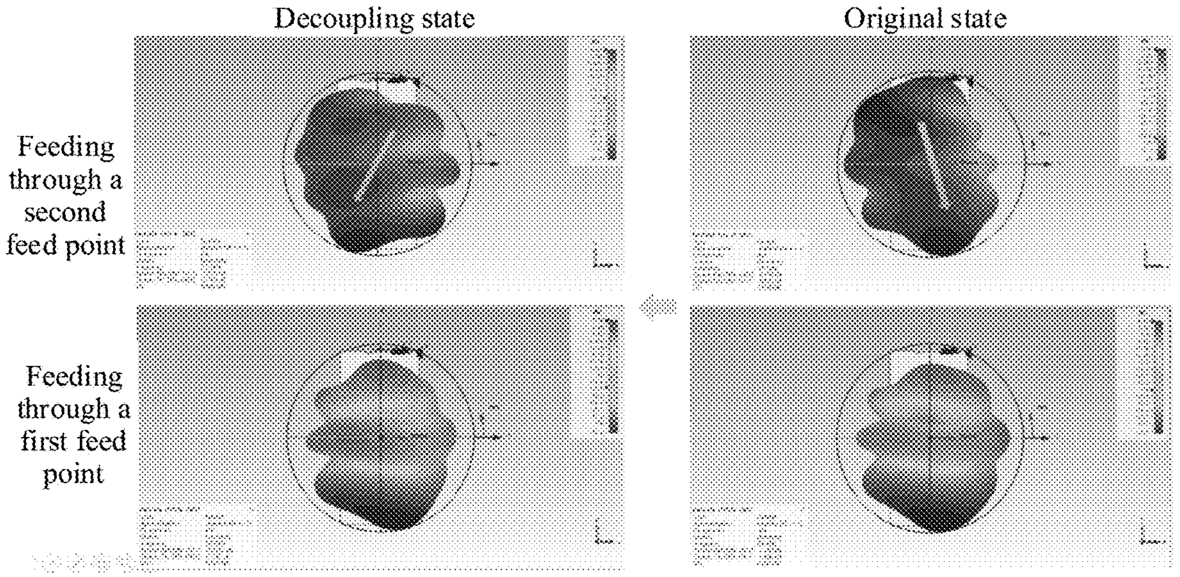
FIG. 14 is an antenna direction comparison diagram before and after a third radiation branch is added according to an embodiment of this application.

In terms of antenna pattern analysis, in the original state, in FIG. 14, when N41 signals are fed by the two feed points, high-gain directions of the antenna pattern are close to each other, shown as an illustrated lower right direction (a direction facing the paper). In this case, independence between the first radiation branch and the second radiation branch is low, and the isolation is also low. In the decoupling state, when the second feed point feeds the N41 signal, a high-gain direction of a corresponding antenna pattern is changed from the lower right direction to a lower left direction, and the high-gain direction of the antenna pattern is different from the high-gain direction of the antenna pattern obtained when the first feed point feeds the N41 signal. In this case, independence between the first radiation branch and the second radiation branch is improved, and the isolation is also improved.

Next, influence of a size of each radiation branch on the antenna performance is described with reference to graphs.

Figure 15:
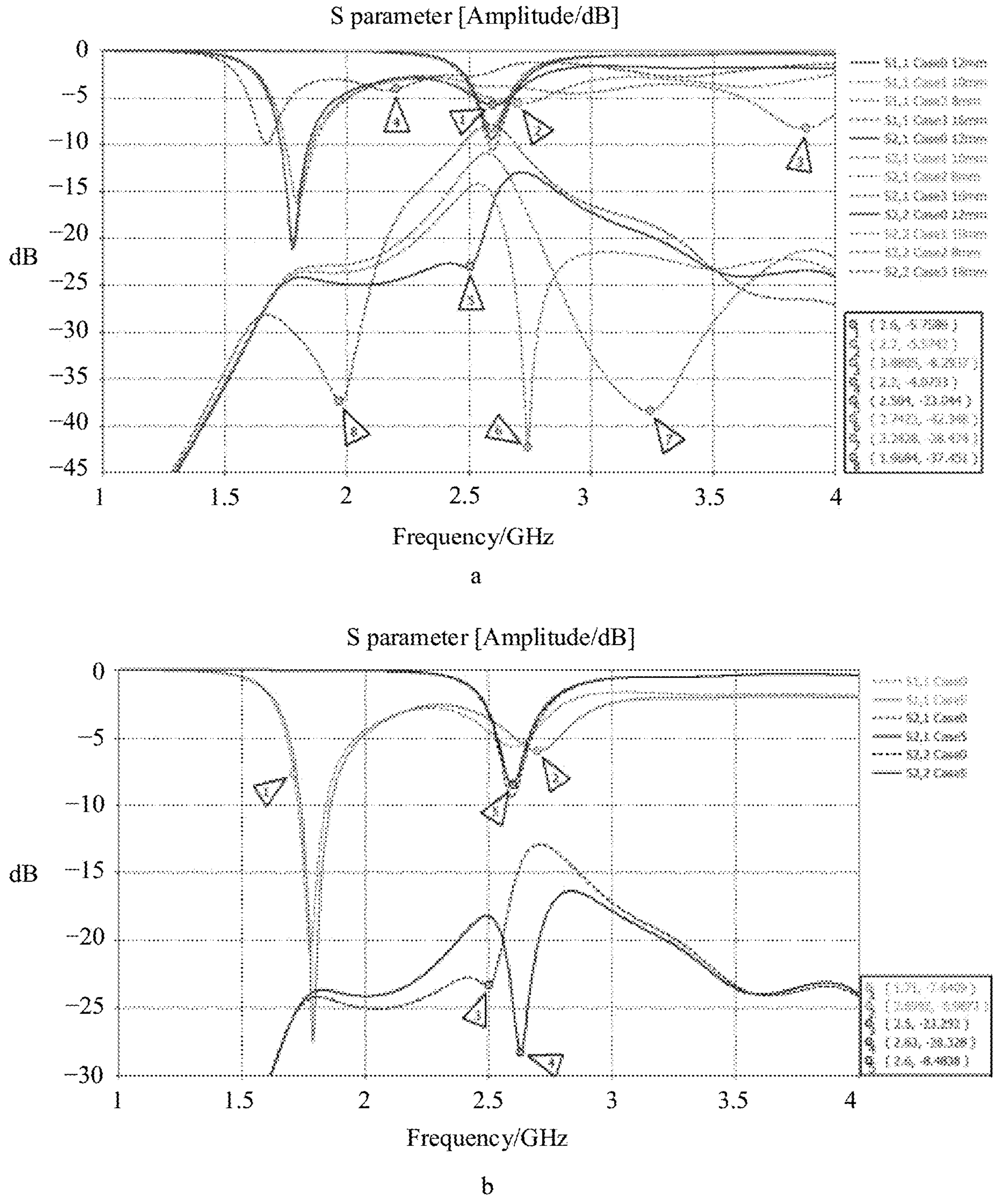
FIG. 15 is an S parameter curve comparison diagram of an antenna system when a third radiation branch of different lengths is used according to an embodiment of this application.

As mentioned above, the length of the third radiation branch can affect the resonance frequency, so that the length of the third radiation branch is controlled to implement canceling of the currents of the C mode and the D mode by each other, and an S21 pit is present in a curve of S21, that is, S21 of a large-isolation frequency band, and the pit position of S21 is to change with the length of the third radiation branch. Refer to figure a in FIG. 15. Figure a in FIG. 15 shows graphs of S21 corresponding to the third radiation branch of different lengths when lengths of other radiation branches remain unchanged. It can be seen from FIG. 15 that when the length of the third radiation branch is 8 mm, 10 mm, 12 mm and 16 mm respectively, corresponding points of corresponding S21 pits are points 7, 6, 5, and 8, and the points 7, 6, 5 and 8 are respectively corresponding to frequencies 3.24 GHZ, 2.74 GHZ, 2.5 GHz and 1.968 GHz. It can be seen that a larger length of the third radiation branch indicates a lower frequency of a decoupling frequency; and a smaller length of the third radiation branch indicates a higher frequency of a decoupling frequency. If a medium-frequency signal is to be decoupled, for example, a signal of 1.71 GHz is decoupled, the length of the third radiation branch may continue to be lengthened from 16 mm.

After the length of the third radiation branch is determined, the matching form of the first tuning circuit 309 may also be adjusted to fine tune the decoupling frequency. For example, it is determined that the length of the third radiation branch is 12 mm, and parameter curves before and after fine tuning of the first tuning circuit 309 may be shown in figure b in FIG. 15. In figure b in FIG. 15, a dotted line is the parameter curve before adjustment (case0), a solid line is the parameter curve after adjustment (case5), it can be seen that S22 variation is not large; S11 is optimized in the medium-frequency band; and S21 is reduced obviously, and a point 4 is reduced from −15 dB before adjustment to −28 dB.

Figure 16:
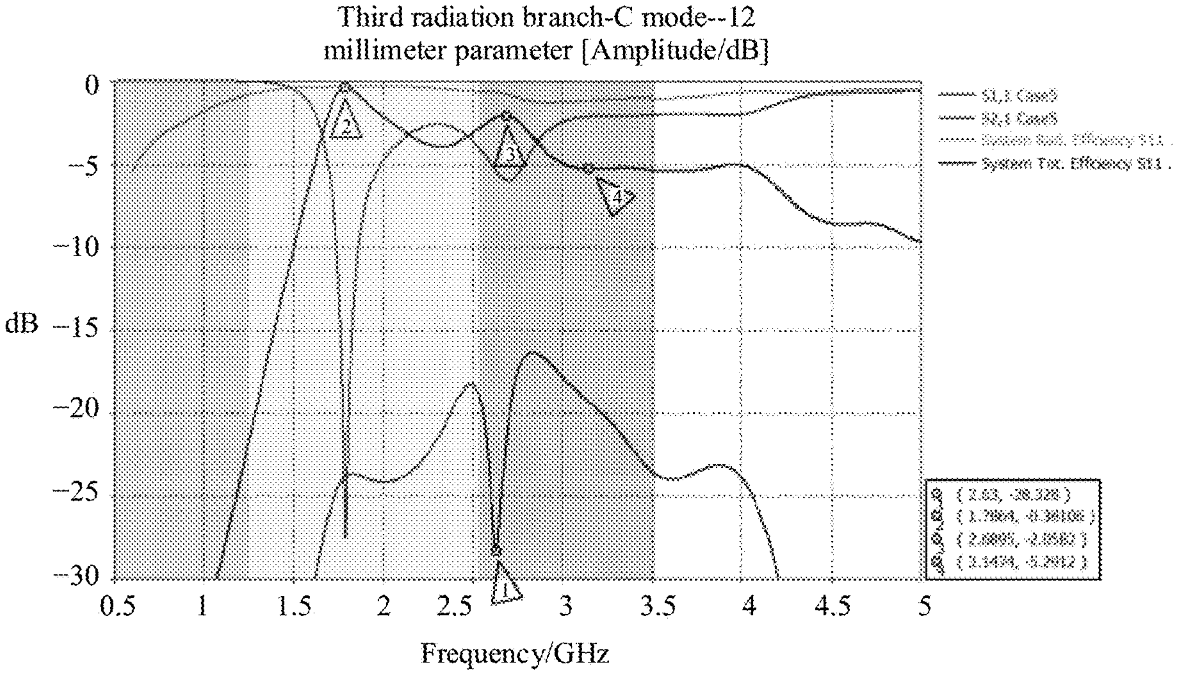
FIG. 16 is a schematic diagram in which frequencies of pit points of S21 corresponding to a first radiation branch and a second radiation branch are lower than a frequency of a pit point of D-mode radiation efficiency generated by a third radiation branch according to an embodiment of this application.
Figure 17:
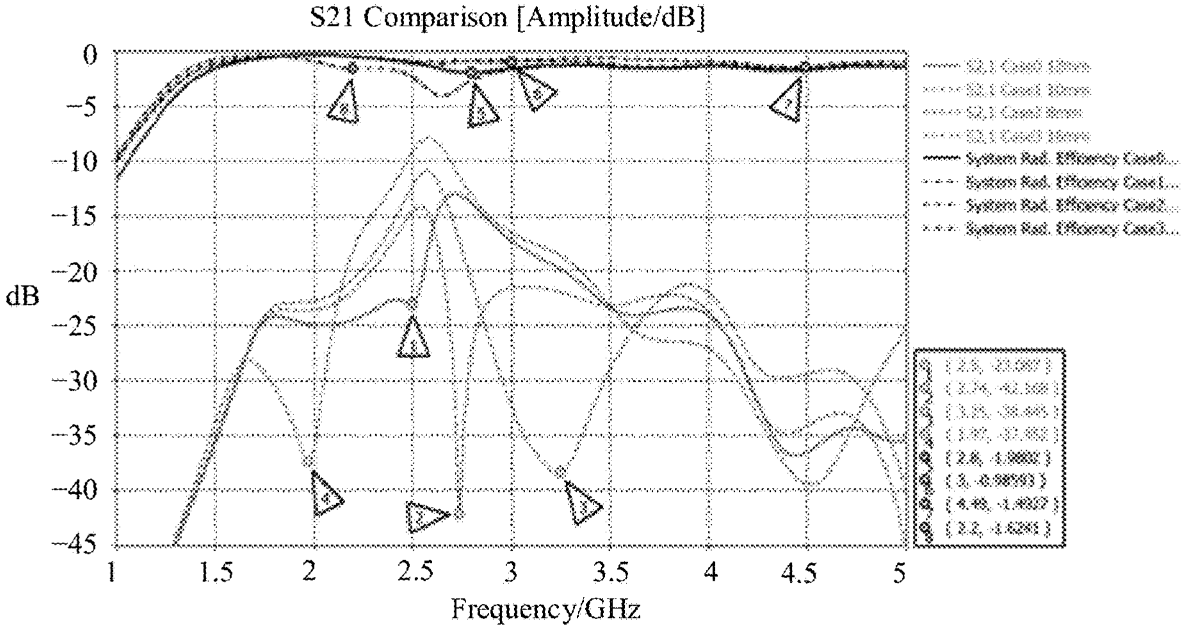
FIG. 17 is a schematic diagram in which frequencies of pit points of S21 corresponding to a first radiation branch and a second radiation branch are lower than a frequency of a pit point of D-mode radiation efficiency generated by a third radiation branch when a third radiation branch of different lengths is used according to an embodiment of this application.

During adjustment, frequencies of pit points of S21 corresponding to the first radiation branch and the second radiation branch need to be adjusted to lower than a frequency of a pit point of D-mode radiation efficiency generated by the third radiation branch. As shown in FIG. 16, the S21 pits of the first radiation branch and the second radiation branch are at 2.63 GHz, the frequency of the D-mode radiation efficiency of the third radiation branch is 3.15 GHZ, and isolation at a 1 point is-28 dB, which meets a requirement of isolation. Still refer to FIG. 17. When sizes of the third radiation branch are 8 mm, 10 mm, 12 mm and 16 mm respectively, frequencies of the pit points of S21 are lower than a frequency of a pit point of D-mode radiation efficiency corresponding to the third radiation branch:

When the third radiation branch is 8 mm, a frequency (3.25 GHZ) of S21 Mark 3<a frequency (4.49 GHZ) of Mark 7 (a lowest point of D mode);

when the third radiation branch is 10 mm, a frequency (2.74 GHZ) of S21 Mark 2<a frequency (3 GHZ) of Mark 6 (a lowest point of D mode);

when the third radiation branch is 12 mm, a frequency (2.5 GHZ) of S21 Mark 1<a frequency (2.8 GHZ) of Mark 5 (a lowest point of D mode); and when the third radiation branch is 16 mm, a frequency (1.97 GHz) of S21 Mark 4<a frequency (2.2 GHZ) of Mark 8 (a lowest point of D mode).

The above describes in detail the examples of the antenna system provided in this application. It can be understood that, to implement the foregoing functions, the corresponding terminal device includes a corresponding hardware for executing the functions.

In the several embodiments provided in this application, it should be understood that the disclosed structure may be implemented in other manners. For example, the described structural embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of solutions of embodiments.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. An antenna system, comprising: a first radiation branch, a second radiation branch and a third radiation branch, wherein the first radiation branch and the second radiation branch are electrically connected, and a first gap is provided between the second radiation branch and the third radiation branch;

a first feed point is disposed on the first radiation branch, and the first feed point is located at an end of the first radiation branch away from the second radiation branch;

a second feed point is disposed on the second radiation branch, and the second feed point is located at an end of the second radiation branch away from the first radiation branch;

the antenna system further comprises: a first ground return point, wherein the first ground return point is located at an electrical connection between the first radiation branch and the second radiation branch, and the first ground return point is located between the first feed point and the second feed point; and a second ground return point is disposed on the third radiation branch, and the second ground return point is located at an end of the third radiation branch away from the first gap;

wherein the first feed point is configured to feed a high-frequency signal, and the second feed point is configured to feed a high-frequency signal and/or a medium-frequency signal;

wherein the high-frequency signal is a signal in an N41 frequency band; and wherein a length difference between a length of the third radiation branch and a quarter wavelength of the signal in the N41 frequency band is less than a length error threshold.

2. The antenna system according to claim 1, wherein when the first feed point and the second feed point feed the high-frequency signal, a current mode in the antenna system is a differential mode.

3. The antenna system according to claim 1, wherein a distance between the first ground return point and the second feed point is greater than a distance between the first feed point and the first ground return point.

4. The antenna system according to claim 3, wherein the length of the third radiation branch is greater than a distance between an end of the second radiation branch close to the first gap to the second feed point.

5. The antenna system according to claim 4, wherein a first tuning circuit is further disposed on the third radiation branch, and an end of the third radiation branch close to the first gap is grounded through the first tuning circuit.

6. The antenna system according to claim 4, wherein a second tuning circuit is further disposed on the second radiation branch, the second tuning circuit is located between the second feed point and the first ground return point, and the second radiation branch is grounded through the second tuning circuit.

7. The antenna system according to claim 6, wherein the antenna system further comprises a third tuning circuit, and the first feed point is grounded through the third tuning circuit.

8. The antenna system according to claim 6, wherein the antenna system further comprises a fourth tuning circuit, and the second feed point is grounded through the fourth tuning circuit.

9. The antenna system according to claim 1, wherein a shape of the first radiation branch is L-shaped.

10. A terminal device, comprising the antenna system according to claim 1.

11. The antenna system according to claim 1, wherein the first feed point and the second feed point feed signals of a same frequency.

12. The antenna system according to claim 11, wherein directions of currents that are formed on the first radiation branch and the second radiation branch are opposite, so that some currents on the first radiation branch and the second radiation branch cancel each other.

13. The antenna system according to claim 1, wherein no feed point is disposed on the third radiation branch.

14. An antenna system, comprising: a first radiation branch, a second radiation branch and a third radiation branch, wherein the first radiation branch and the second radiation branch are electrically connected, and a first gap is provided between the second radiation branch and the third radiation branch;

a first feed point is disposed on the first radiation branch, and the first feed point is located at an end of the first radiation branch away from the second radiation branch;

a second feed point is disposed on the second radiation branch, and the second feed point is located at an end of the second radiation branch away from the first radiation branch;

wherein the antenna system further comprises: a first ground return point, wherein the first ground return point is located at an electrical connection between the first radiation branch and the second radiation branch, and the first ground return point is located between the first feed point and the second feed point; and wherein a second ground return point is disposed on the third radiation branch, and the second ground return point is located at an end of the third radiation branch away from the first gap;

wherein a distance between the first ground return point and the second feed point is greater than a distance between the first feed point and the first ground return point;

wherein a length of the third radiation branch is greater than a distance between an end of the second radiation branch that is close to the first gap to the second feed point; and wherein a first tuning circuit is further disposed on the third radiation branch, and an end of the third radiation branch close to the first gap is grounded through the first tuning circuit.

15. The antenna system according to claim 14, wherein no feed point is disposed on the third radiation branch.

16. The antenna system according to claim 14, wherein a second tuning circuit is further disposed on the second radiation branch, the second tuning circuit is located between the second feed point and the first ground return point, and the second radiation branch is grounded through the second tuning circuit.

17. The antenna system according to claim 14, wherein the antenna system further comprises a third tuning circuit, and the first feed point is grounded through the third tuning circuit.

18. An antenna system, comprising: a first radiation branch, a second radiation branch and a third radiation branch, wherein the first radiation branch and the second radiation branch are electrically connected, and a first gap is provided between the second radiation branch and the third radiation branch;

a first feed point is disposed on the first radiation branch, and the first feed point is located at an end of the first radiation branch away from the second radiation branch;

a second feed point is disposed on the second radiation branch, and the second feed point is located at an end of the second radiation branch away from the first radiation branch;

wherein the antenna system further comprises: a first ground return point, wherein the first ground return point is located at an electrical connection between the first radiation branch and the second radiation branch, and the first ground return point is located between the first feed point and the second feed point; and a second ground return point is disposed on the third radiation branch, and the second ground return point is located at an end of the third radiation branch away from the first gap;

wherein the first feed point and the second feed point feed signals of a same frequency; and wherein directions of currents that are formed on the first radiation branch and the second radiation branch are opposite, so that some currents on the first radiation branch and the second radiation branch cancel each other.

19. The antenna system according to claim 18, wherein no feed point is disposed on the third radiation branch.

20. The antenna system according to claim 18, wherein when the first feed point and the second feed point feed a same high-frequency signal, a current mode in the antenna system is a differential mode.

* * * * *